United States Patent

Seelert et al.

Patent Number: 5,994,471
Date of Patent: Nov. 30, 1999

[54] PLASTIC COMPOSITIONS PARTIALLY CROSSLINKED BY UNSATURATED ESTERS

[75] Inventors: Stefan Seelert, Frankenthal; Joachim Rösch, Ludwigshafen; Klaus-Dieter Rümpler, Wachenheim; Meinolf Kersting, Neustadt; Karl Huber, Frankenthal, all of Germany

[73] Assignee: BASF Aktiengesellschaft, Ludwigshafen, Germany

[21] Appl. No.: 08/959,166

[22] Filed: Oct. 28, 1997

[51] Int. Cl.⁶ .................. C08L 23/10; C08L 23/14; C08L 23/26
[52] U.S. Cl. .................. 525/193; 525/192; 525/194; 525/240; 525/242; 525/298; 525/302
[58] Field of Search ................ 525/193, 88, 240, 525/302, 192, 194, 242, 298

[56] References Cited

U.S. PATENT DOCUMENTS

| | | | |
|---|---|---|---|
| 4,367,185 | 1/1983 | Nojiri | 264/22 |
| 4,857,613 | 8/1989 | Zolk et al. | |
| 5,288,824 | 2/1994 | Kerth et al. | |
| 5,569,717 | 10/1996 | Lambla | 525/193 |

FOREIGN PATENT DOCUMENTS

| | | |
|---|---|---|
| 171 200 | 2/1986 | European Pat. Off. |
| 515 855 | 12/1992 | European Pat. Off. |
| 688 817 | 12/1995 | European Pat. Off. |
| 61152442 | 12/1984 | Japan . |
| 63142056 | 12/1986 | Japan . |
| 413104 | 9/1990 | Japan . |
| 2111066 | 6/1983 | United Kingdom . |

OTHER PUBLICATIONS

Kim et al., *J. Appl. Polm. Sci.*, vol. 61, 1996, pp. 439 ff.
*Acta Polymerica*, 42, 1991, pp. 584–589.
*Makromol. Chem.*, vol. 178, p. 2335, 1977.

Primary Examiner—Fred Zitomer
Attorney, Agent, or Firm—Keil & Weinkauf

[57] ABSTRACT

Partially crosslinked plastic compositions with a melt flow index at 230° C. and under a load of 2.16 kg, of from 0.1 to 100 g/10 min, and a gel content of less than 12% by weight, is prepared from a) a polymer comprising
   $a_1$) from 60 to 92% by weight of a propylene homopolymer and
   $a_2$) from 8 to 40% by weight of a propylene copolymer having $C_2$–$C_{10}$-alk-1-enes incorporated into its polymer chain and with a comonomer content, based on $a_2$) of from 15 to 70% by weight, and b) a compound of the formula (I)

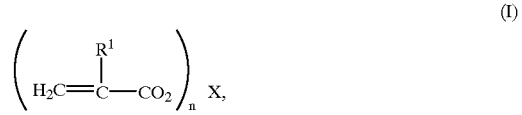

where
$R^1$ is hydrogen or $C_1$–$C_4$-alkyl,
X is substituted or unsubstituted $C_1$–$C_{30}$-alkyl or substituted or unsubstituted $C_7$–$C_{30}$-arylalkyl, where each of the alkyl groups may be interrupted by
one or more oxygen atoms in ether moieties (—O—) or oxycarbonyl moieties (—O—CO—) and/or by
nitrogen groups of the formula $NR^2$, where $R^2$ is hydrogen, C–$C_6$-alkyl or $C_1$–$C_6$-hydroxyalkyl,
and
n is the number 2 or 3, obtainable by reacting the polymer a) with the compound b) at from 180 to 280° C., under a pressure of from 1 to 100 bar, and with mean residence times of the reaction mixture of from 0.2 to 10 minutes.

12 Claims, No Drawings

PLASTIC COMPOSITIONS PARTIALLY CROSSLINKED BY UNSATURATED ESTERS

The present invention relates to partially crosslinked plastic compositions with a melt flow index, at 230° C. and under a load of 2.16 kg, of from 0.1 to 100 g/10 min and a gel content of less than 12% by weight, prepared from a) a polymer comprising
   $a_1$) from 60 to 92% by weight of a propylene homopolymer and
   $a_2$) from 8 to 40% by weight of a propylene copolymer having $C_2$–$C_{10}$-alk-1-enes incorporated into its polymer chain and with a comonomer content, based on $a_2$) of from 15 to 70% by weight, and
b) a compound of the formula (I)

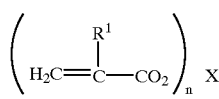

where
$R^1$ is hydrogen or $C_1$–$C_4$-alkyl,
X is substituted or unsubstituted $C_1$–$C_{30}$-alkyl or substituted or unsubstituted $C_7$–$C_{30}$-arylalkyl, where each of the alkyl groups may be interrupted by
one or more oxygen atoms in ether moieties (—O—) or oxycarbonyl moieties (—O—CO—) and/or by
nitrogen groups of the formula $NR^2$, where $R^2$ is hydrogen, $C_1$–$C_6$-alkyl or $C_1$–$C_6$-hydroxyalkyl,
and
n is the number 2 or 3,
obtainable by reacting the polymer a) with the compound b) at from 180 to 280° C., under a pressure of from 1 to 100 bar, and with mean residence times of the reaction mixture of from 0.2 to 10 minutes.

The invention also relates to a process for preparing partially crosslinked plastic compositions, and to films, fibers and shaped articles made from these plastic compositions.

To improve the toughness of homopolypropylenes and in particular to improve the toughness at below 0° C., it is usual to add ethylene-propylene copolymers to the homopolypropylene as impact modifiers. The most cost-effective method of doing this has proven to be to prepare the impact-modified polypropylenes directly in a multistep polymerization. These products are termed polypropylene block copolymers or polypropylene impact copolymers. Ethylene-propylene copolymers of this type are described, for example, in EP-A 515 855.

For the impact-modified polypropylenes, it is generally the case that to improve the toughness a reduction in stiffness has to be accepted. Although the property profile achieved is adequate for many applications, further improvements in a large number of properties are desirable, for example, besides the stiffness/toughness ratio, heat resistance, weld line strength and stress-whitening, ie. the undesirable appearance of white coloration after impact stress.

One way of improving the properties of polymers is crosslinking. Crosslinked polymers, in comparison with non-crosslinked polymers, have the advantage of higher mechanical stability. However, completely crosslinked materials, because of their low melt flowability, cannot be shaped using heat by the conventional methods of plastics processing (H. G. Elias, "Makromoleküle", Verlag Hüthig & Wepf, 4th Edition, p. 1000–1003). For the processing of polymers, therefore, it is necessary to ensure that the degree of crosslinking of the polymers is not too high, so that they retain the ability to be shaped using devices which are usual in plastics processing. The crosslinking can be carried out using unsaturated silanes in the presence of a condensation catalyst and a peroxide. It is also possible to employ bismaleimido compounds or multifunctional metal (meth) acrylates, in each case in the presence of initiators which decompose to give free-radicals.

The crosslinking of polyolefins using peroxides with addition of (meth)acrylates of polyhydric alcohols is also known. For example, JP-A 41/30 106 describes a process for preparing thermoplastic elastomers in which mixtures of polyolefins and rubbers are reacted in the presence of peroxides with acrylates such as trimethylolpropane triacrylate. The products thus obtained are, however, highly crosslinked, and have a gel content, which is a measure of the degree of crosslinking, of at least 100%, based on the rubber content. JP-A 63/142 056 also describes a process for crosslinking thermoplastic elastomers using triacrylates, in which the resultant products likewise have gel contents of at least 20%.

Disadvantages of these processes are that relatively high amounts of crosslinker must be employed and that the materials produced from them are completely crosslinked, ie. have high gel contents, with the result that they may be processed only with difficulty.

The preparation of the crosslinked polypropylene foams which are described in U.S. Pat. No. 4,367,185 and which are prepared with addition of triacrylates, also requires relatively high amounts of crosslinker. The resultant polymers therefore likewise have a relatively high gel content.

Addition of peroxide and multifunctional acrylates, such as trimethylolpropane triacrylate, to extruder blends of propylene homopolymer and ethylene-propylene rubber with a propene content of from 26 to 28% can increase the notched impact strength of the blends (B. C. Kim and H. I. Do: J. Appl. Polm. Sci. 61, 439ff, (1996)). Such mixtures are, however, technically more difficult to prepare than polypropylene impact copolymers which are polymerized in one multistep process, where a mixture of propylene homopolymer and ethylene-propylene rubber is formed during the polymerization itself.

EP-A 686 664 proposes reacting polymer mixtures made from a homo- or copolymer of propylene having at least 50 mol % of propylene and a homo- or copolymer of ethylene having at least 90 mol % of ethylene, in the melt, with a free-radical generator and a crosslinker which contains at least 3 acrylate groups. The resultant formulations have improved rheological properties. These polymer mixtures, too, consist of two polymer components. In the melt, these are present alongside one another as separate phases, and it is difficult to reproduce on each occasion the same stable, homogeneous distribution of the components within one another.

EP-A 688 817 and JP-A 61/152 442 describe plastic compositions obtained by reacting, inter alia, polypropylene block copolymers with multifunctional acrylates, such as trimethylolpropane triacrylate. The molding compositions disclosed in these patents, however, have relatively low stiffness and an unsatisfactory stiffness/toughness ratio.

It is an object of the present invention to develop partially crosslinked plastic compositions with high stiffness, a good stiffness/toughness ratio, high heat resistance, good weld line strength, low tendency to stress-whitening and very low gel contents. Furthermore, these should be capable of being prepared by a low-cost process employing a limited amount of crosslinker.

We have found that this object is achieved by means of the partially crosslinked plastic compositions defined at the outset.

The novel partially crosslinked plastic compositions have a melt flow index, at 230° C. and under a load of 2.16 kg, of from 0.1 to 100 g/10 min. The melt flow index gives the amount of polymer which is extruded from the test apparatus standardized according to ISO 1133 over a period of 10 minutes, at 230° C., and under a load of 2.16 kg. Particular preference is given to partially crosslinked plastic compositions whose melt flow index at 230° C. and under a load of 2.16 kg, is from 0.1 to 50 g/10 min.

The gel content of the novel partially crosslinked plastic compositions is less than 12% by weight. The gel content gives the proportion by weight of the polymer remaining in the holder, after drying, after extraction with boiling p-xylene for 24 hours in a Soxhlet apparatus. In particular, the novel partially crosslinked plastic compositions have gel contents below 8% by weight.

The novel partially crosslinked plastic compositions comprise a polymer a) comprising from 60 to 92% by weight of a propylene homopolymer $a_1$) and from 8 to 40% by weight of a propylene copolymer $a_2$), preference being given to plastic compositions whose polymer a) comprises from 66 to 90% by weight of a propylene homopolymer $a_1$) and from 10 to 34% by weight of a propylene copolymer $a_2$), and particular preference is given to plastic compositions whose polymer a) comprises from 72 to 88% by weight of a propylene homopolymer $a_1$) and from 12 to 28% by weight of a propylene copolymer $a_2$). The propylene copolymers $a_2$) contain from 15 to 70% by weight of $C_2$–$C_{10}$-alk-1-enes incorporated into their polymer chains. Preference is given to polymers a) whose propylene copolymers $a_2$) have a comonomer content of from 20 to 65% by weight, and in particular from 30 to 55% by weight of $C_2$–$C_{10}$-alk-1-enes incorporated into their polymer chains.

$C_2$–$C_{10}$-Alk-1-enes incorporated into the polymer chain include, in this context in particular, ethylene, but-1-ene, pent-1-ene, hex-1-ene, hept-1-ene or oct-1-ene or mixtures of these comonomers, ethylene or but-1-ene being preferred.

The polymer a) to be used according to the invention can be prepared in the conventional reactors used for the polymerization of propylene, in the gas phase, in solution, in liquid monomers or in suspension, and in either batch, semicontinuous or preferably continuous polymerization. Suitable reactors are, inter alia, continuous-flow stirred tank reactors, loop reactors and fluidized bed reactors.

The polymer a) is preferably prepared in a multi-step polymerization process in which the propylene homopolymer $a_1$) is prepared in a first step and then, in at least one further step, the propylene copolymer $a_2$) is prepared. In batch operation, the polymerization steps follow each other, with variation of the reaction conditions. Continuous operation is generally used, however, the propylene homopolymer $a_1$) firstly being prepared in the first step in one or more reactors, and then, in one or more further reactors, the propylene copolymer $a_2$) is prepared. For preparing the polymer a) it is also possible to combine different reactor types. In a particularly preferred embodiment, polymer a) is prepared in a two-step gas phase process employing continuous-flow stirred tank reactors. The reactors contain a fixed bed of finely divided polymer, usually kept in motion by stirring.

The process can be carried out using conventional Ziegler-Natta polymerization catalysts. These contain inter alia, besides a titanium-containing solid component, cocatalysts, for example an aluminum compound. Besides this aluminum compound, one or more electron-donor compounds are preferably employed as further constituents of the cocatalyst.

The titanium compound used to prepare the titanium-containing solid component is generally a halide or alkoxide of tri- or tetravalent titanium, titanium chlorides, in particular titanium tetrachloride, being preferred. It is advantageous if the titanium-containing solid component contains a finely divided support material; silica and alumina and aluminum silicates of the formula $SiO_2 \cdot aAl_2O_3$, where a is from 0.001 to 2, in particular from 0.01 to 0.5, are well proven for this purpose.

The support material preferably used has a particle diameter of 0.1 to 1000 μm, in particular from 10 to 300 μm, a pore volume of from 0.1 to 10 cm³/g, in particular from 1.0 to 5.0 cm³/g, and a specific surface area of from 10 to 1000 m²/g, in particular from 100 to 500 m²/g.

The finely divided support material for the titanium-containing solid component may also in particular be a finely divided inorganic oxide having a pH of from 1 to 6, a mean particle diameter of from 5 to 200 μm, in particular from 20 to 70 μm, and a mean particle diameter of the primary particles of from 1 to 20 μm, in particular from 1 to 5 μm. These primary particles are porous oxide granules which are obtained from a suitable hydrogel by milling, after sieving if desired. This hydrogel is produced in the acid range, ie. in a pH range from 1 to 6, or is aftertreated and purified using similarly acid washing solutions.

A further feature of the finely divided inorganic oxide, inter alia, is that it has voids or channels with a mean diameter from 0.1 to 20 μm, in particular from 1 to 15 μm, which form a macroscopic volume proportion of the total particle of from 5 to 30%, in particular from 10 to 30%. The finely divided inorganic oxide also has, in particular, a pore volume of from 0.1 to 10 cm³/g, preferably from 1.0 to 4.0 cm³/g, and a specific surface area of from 10 to 1000 m²/g, preferably from 100 to 500 m²/g. The pH, ie. the negative common logarithm of the concentration of protons of the inorganic oxide is in the range from 1 to 6, in particular from 2 to 5.

Preferred inorganic oxides are in particular oxides of silicon, aluminum, titanium or one of the metals of the first or second main group of the Periodic Table. Apart from alumina or magnesium oxide or a sheet silicate, a particularly preferred oxide is silica gel ($SiO_2$), these being obtainable in particular by spray drying. It is also possible to use cogels, ie. mixtures of two different inorganic oxides. Finely divided inorganic oxides of this type are, however, also commercially available.

In preparing the titanium-containing solid component, compounds of magnesium, inter alia, are also employed, for example magnesium halides, alkylmagnesium compounds and arylmagnesium compounds, and alkoxymagnesium and aryloxymagnesium compounds, preference being given to magnesium dichloride, magnesium dibromide and di($C_1$–$C_{10}$-alkyl)magnesium compounds. The titanium-containing solid component may contain, in addition, halogen, preferably chlorine or bromine.

The titanium-containing solid component contains, in addition, electron-donor compounds, for example mono- or polyfunctional carboxylic acids, carboxylic anhydrides or carboxylic esters, ketones, ethers, alcohols, lactones, or organophosphorus or organosilicon compounds. Preferred electron-donor compounds within the titanium-containing solid component are phthalic acid derivatives of the formula I

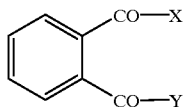

where X and Y are each chlorine or $C_1$–$C_{10}$-alkoxy, or both together are oxygen. Particularly preferred electron-donor compounds are phthalates where X and Y are $C_1$–$C_8$-alkoxy, for example methoxy, ethoxy, propoxy or butoxy.

Other preferred electron-donor compounds within the titanium-containing solid component are, inter alia, diesters of substituted or unsubstituted 3- or 4-membered cycloalkyl-1,2-dicarboxylic acids, and monoesters of substituted or unsubstituted benzophenone-2-carboxylic acids. The hydroxy compounds from which these esters are derived are the alcohols conventionally used in esterification reactions, inter alia $C_1$–$C_{15}$-alkanols, $C_5$–$C_7$-cycloalkanols, which may be substituted with $C_1$–$C_{10}$-alkyl, and phenols and naphthols and the $C_1$–$C_{10}$-alkyl derivatives of these compounds.

The titanium-containing solid component can be prepared by methods known per se, examples of which are described, inter alia, in EP-A 171 200, GB-A 2 111 066, U.S. Pat. No. 4,857,613 and U.S. Pat. No. 5,288,824.

For preparing the titanium-containing solid component, the following three-step process is preferably used.

In the first step, a finely divided support material, preferably silica or $SiO_2.aAl_2O_3$, where a is a number in the range from 0.001 to 2, in particular from 0.01 to 0.5, is firstly mixed with a solution of the magnesium-containing compound in a liquid alkane, and then this mixture is stirred for 0.5 to 5 hours at from 10 to 120° C. From 0.1 to 1 mol of magnesium compound is preferably used per mole of support material. A halogen or a hydrogen halide, in particular chlorine or hydrogen chloride is then added, with continuous stirring, in at least twofold, preferably in at least fivefold, molar excess, based on the magnesium-containing compound. After from about 30 to 120 minutes, the solid is separated from the liquid phase.

In the second step, the product obtained in this way is introduced into a liquid alkane and a $C_1$–$C_8$-alkanol, in particular ethanol, a halide or an alkoxide of tri- or tetravalent titanium, in particular titanium tetrachloride, and an electron-donor compound, in particular a phthalic acid derivative of the formula I, are then added. The amounts employed per mole of magnesium in the solid obtained from the first step are from 1 to 5 mol, in particular from 2 to 4 mol of alkanol, from 2 to 20 mol, in particular from 4 to 10 mol, of tri- or tetravalent titanium, and from 0.01 to 1 mol, in particular from 0.1 to 1.0 mol, of the electron-donor compound. This mixture is stirred for at least one hour at from 10 to 150° C., and the solid substance obtained is then filtered off and washed with a liquid alkane, preferably hexane or heptane.

In the third step, the solid obtained from the second step is extracted for several hours at from 100 to 150° C. with an excess of titanium tetrachloride or of an excess of a solution of titanium tetrachloride in an inert solvent, preferably an alkylbenzene, where the solvent contains at least 5% by weight of titanium tetrachloride. The product is then washed with a liquid alkane until the titanium tetrachloride content of the wash liquid is less than 2% by weight.

The titanium-containing solid component obtainable in this manner is used with a cocatalyst as Ziegler-Natta catalyst system. Cocatalysts are, for example, aluminum compounds.

Suitable aluminum compounds, besides trialkylaluminum compounds, are also compounds of this type in which an alkyl group is replaced by alkoxy or by halogen, for example by chlorine or bromine.

Preference is given to trialkylaluminum compounds whose alkyl groups each have from 1 to 8 carbon atoms, for example trimethyl-, triethyl- or methyldiethylaluminum.

It is preferable to use, besides the aluminum compound, as further cocatalyst, electron-donor compounds, for example mono- or polyfunctional carboxylic acids, carboxylic anhydrides or carboxylic esters, ketones, ethers, alcohols, lactones, or organophosphorus or organosilicon compounds. Particularly suitable electron-donor compounds here are organosilicon compounds of the formula II

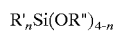

$$R'_nSi(OR'')_{4-n} \qquad II$$

where R' are identical or different and are $C_1$–$C_{20}$-alkyl, from 5- to 7-membered cycloalkyl, which may be substituted with $C_1$–$C_{10}$-alkyl, or $C_6$–$C_{20}$-arylalkyl, R'' are identical or different and are $C_1$–$C_{20}$-alkyl, and n is 1, 2 or 3, particular preference being given to compounds in which R' is $C_1$–$C_8$-alkyl or from 5- to 7-membered cycloalkyl, R'' is $C_1$–$C_4$-alkyl, and n is 1 or 2.

Examples of these compounds are dimethoxydiisopropylsilane, dimethoxyisobutylisopropylsilane, dimethoxydiisobutylsilane, dimethoxydicyclopentylsilane, dimethoxy-sec-butylisopropylsilane, diethoxydicyclopentylsilane, diethoxy-sec-butylisopropylsilane and diethoxyisobutylisopropylsilane.

Preference is given to catalyst systems in which the atomic ratio of aluminum in the aluminum compound to titanium in the titanium-containing solid component is from 10:1 to 800:1, in particular from 20:1 to 200:1, and the molar ratio of aluminum compound to the electron-donor compound employed as cocatalyst is from 1:1 to 100:1, in particular from 2:1 to 20:1. The catalyst constituents can be introduced into the polymerization system individually in any desired sequence, or as a mixture of the components.

With the help of catalyst systems of this type, it is possible to prepare the polymers a) which are present in the novel partially crosslinked plastic compositions. In a particularly preferred two-step process, the propylene homopolymer $a_1$) is firstly prepared in the gas phase in a first polymerization step, and then, in a second polymerization step, the propylene copolymer $a_2$) is prepared.

In the first polymerization step, the polymerization of the propylene is usually carried out at a pressure of from 20 to 40 bar, at from 60 to 90° C., and with a mean residence time of the reaction mixture of from 0.5 to 5 hours. For preparing the propylene homopolymer $a_1$), preference is given to pressures of from 20 to 35 bar and from 65 to 85° C., and mean residence times of from 0.7 to 3.5 hours, the reaction conditions preferably being selected so that in this first polymerization step from 0.05 to 2 kg, preferably from 0.1 to 1.5 kg, of the propylene homopolymer $a_1$) is formed per mmole of the aluminum component. For regulating the molecular weight, the usual regulators for polymerization of alk-1-enes, for example hydrogen, may be added.

The propylene homopolymer $a_1$) thus formed is drawn off from the first polymerization step, together with the catalyst, after the reaction is complete and introduced into the second polymerization step, in which a mixture of propylene and one or more $C_2$–$C_{10}$-alk-1-enes is additionally polymerized with this product, usually at pressures of from 5 to 30 bar at from 30 to 100° C., and with mean residence times of the reaction mixture of from 0.5 to 5 hours. Preference is given to pressures of from 10 to 25 bar at from 35 to 80° C., and mean residence times of from 0.7 to 3.5 hours, the pressures in the second polymerization step usually being at least 7 bar, preferably at least 10 bar, below those in the first polymerization step. $C_2$–$C_{10}$-Alk-1-enes employed here are in particular ethylene or but-1-ene or a mixture of these comonomers. For preparing the propylene copolymer $a_2$), the propylene is copolymerized with the comonomers with the ratio of the partial pressure of the propylene and that of the comonomers set at from 0.1:1 to 20:1, in particular at from 0.2:1 to 15:1. Care should be moreover taken to select polymerization parameters which give a weight ratio of monomers reacted in the first and in the second polymerization steps which is in the range from 0.2:1 to 20:1, in particular from 0.4:1 to 15:1.

The melt flow indices of the polymers a) obtainable in this manner are in the range from 0.1 to 100 g/10 min, in particular from 0.5 to 50 g/10 min, at 230° C. and with 2.16 kg load, as in ISO 1133, the melt flow index being the amount of polymer which is extruded from the test apparatus standardized according to ISO 1133, at 230 C., and under a load of 2.16 kg.

The novel partially crosslinked plastic compositions further comprise a compound of the formula (I)

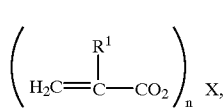

where $R^1$ is hydrogen or $C_1$–$C_4$-alkyl,

X is substituted or unsubstituted $C_1$–$C_{30}$-alkyl or substituted or unsubstituted $C_7$–$C_{30}$-arylalkyl, where each of the alkyl groups may be interrupted by one or more oxygen atoms in ether moieties (—O—) or oxycarbonyl moieties (—O—CO—) and/or by nitrogen groups of the formula $NR^2$, where $R^2$ is hydrogen, $C_1$–$C_6$-alkyl or $C_1$–$C_6$-hydroxyalkyl, and n is the number 2 or 3, preferred compounds b) of the formula (I) being those in which $R^1$ is hydrogen, methyl or ethyl. Particularly preferred compounds b) are those where $R^1$ is hydrogen or methyl, and are thus derivatives of (meth)acrylic acid.

In particular, compounds b) of the formula (I) are those in which X is $C_2$–$C_{20}$-alkyl, which may be interrupted by one or more oxygen atoms in ether moieties, particular preference being given to trimethylol($C_2$–$C_4$-alkane)triacrylates, and in particular trimethylolpropane triacrylate. Examples of such radicals X are, inter alia, groups derived from the following alcohols: hexanediol, tripropylene glycol, dipropylene glycol, glycerol, trimethylolethanetriol, trimethylolpropanetriol and trimethylolbutanetriol.

Further examples of compounds b) are those in which X is $C_2$–$C_{20}$-alkyl, in particular $C_4$–$C_{20}$-alkyl, interrupted by one or more $NR^2$ groups, in which $R^2$ is hydrogen, $C_1$–$C_6$-alkyl or $C_1$–$C_6$-hydroxyalkyl, and by further oxygen atoms if desired.

The radicals X in the compounds b) may also consist of $C_7$–$C_{30}$-arylalkyl, in particular $C_8$–$C_{20}$-arylalkyl, interrupted by one or more oxygen atoms and/or nitrogen moieties, for example radicals derived from phenylglycerol or from bisphenol-A-diglycerol.

The $C_1$–$C_{30}$-alkyl or $C_7$–$C_{30}$-arylalkyl groups in the radicals X may be substituted or unsubstituted, examples of substituents being $C_1$–$C_6$-alkyl, OH and other usual organic substituents.

The abovementioned alcohols are reacted with the appropriate unsaturated carboxylic acids, for example (meth) acrylic acid, by usual methods, giving the corresponding unsaturated compounds b). The compounds b) are, furthermore, also available commercially.

The novel partially crosslinked plastic compositions are obtainable by reacting the polymer a) or the propylene homopolymer $a_1$) and the propylene copolymer $a_2$) with the compound b) at from 180 to 280° C., at pressures from 1 to 100 bar, and with mean residence times of the reaction mixture of from 0.2 to minutes, preference being given to pressures of from 1 to 60 bar at from 190 to 260° C., and mean residence times of from 0.2 to 5 minutes. The reaction of the individual components with one another is carried out in the apparatus usually employed in plastics processing for combining of substances, for example in drum mixers, mills, screw extruders, Diskpack plasticators, roll mills or compounders.

The reaction of the polymer a) with the compound b) giving the novel partially crosslinked plastic compositions can be carried out either in the absence or in the presence of an initiator which decomposes to give free-radicals.

The free-radical initiators employed are preferably organic peroxides or azo compounds, preference being given to organic peroxide compounds which have half-lives of from 1 to 30 seconds at 210° C. Of these compounds, particular preference is given to dicumyl peroxide, cumyl tert-butyl peroxide, di(tert-butyl) peroxide, 2,5-dimethyl-2,5-di(tert-butylperoxy)hexane and 2,5-dimethyl-2,5-di(tert-butylperoxy)-3-hexyne.

For preparing the novel partially crosslinked plastic compositions, from 0.001 to 5.0 parts by weight of compound b) and from 0 to 2.0 parts by weight of the initiator which decomposes giving free-radicals are generally used for every 100 parts by weight of the polymer a). For every 100 parts by weight of the polymer a), from 0.01 to 2.0 parts by weight, in particular from 0.02 to 1.0 part by weight of the compound b) and from 0 to 1.0 part by weight, in particular from 0 to 0.5 part by weight of the initiator which decomposes to give free-radicals are preferably employed.

The reaction of the polymer a) with the compound b) is preferably carried out in extruders, in particular in twin-screw extruders. In a preferred embodiment, the polymer a) is metered together with the compound b) and the initiator which decomposes to give free-radicals, if used, into the feed zone of a twin-screw extruder, where the mixture is melted at from about 180 to 190° C. and then is reacted at from 180 to 280° C. over from 0.2 to 10 minutes.

The compound b) and the initiator which decomposes to give free-radicals, if used, may also be added into the extruder after the polymer a) has been melted.

In a likewise preferred preparation process, the compound b) and the initiator which decomposes to give free-radicals, if used, are added to the polymer a) immediately after its preparation, in a mixing apparatus joined to the preparation reactors. Extruders are used in particular as mixing apparatus.

The novel partially crosslinked plastic compositions have, inter alia, a low gel content, high rigidity, a very good rigidity/toughness ratio, high heat resistance, good weld line strength and low tendency to stress-whitening. In contrast to fully crosslinked plastics, the novel partially crosslinked plastic compositions retain the capability to be processed easily.

The novel partially crosslinked plastic compositions are suitable, because of their good processability, in particular as materials for injection molding, blow molding and extrusion, and for the production of foams, and may thus be used to produce, inter alia, films, fibers and shaped articles.

EXAMPLES

Each of the polymers a) employed in Examples 1 and 2 and in the Comparative Examples A, B and C were prepared by two-step continuous gas phase polymerization in two stirred autoclaves connected in series, each of which had been filled with an agitated fixed bed of finely divided polypropylene. The novel partially crosslinked plastic compositions were prepared in a Werner & Pfleiderer ZSK 57 twin-screw extruder with a length/diameter ratio of 27. The polymers a) were fed to the twin-screw extruder in granule form and melted there together with the compound b) and the free-radical initiator c).

The products were characterized by the following tests:

Determination of the melt flow index (MFR):
  according to ISO 1133, at 230° C. and under 2.16 kg load.

Determination of modulus of elasticity (tensile modulus of elasticity):
  according to ISO 527-2, measured at 23° C.

Determination of the Charpy notched impact strength:
  according to ISO 179-2/1eA, measured at 23° C., 0° C. and −20° C.

Determination of the Vicat softening temperature:
  VST/A50 according to ISO 306 with 10 N load,
  VST/B50 according to ISO 306 with 50 N load.

Determination of weld line strength:
  Dumbbell test specimens, injected through two gates, were produced with a weld line in the middle perpendicular to the longitudinal axis, corresponding in their dimensions to the standard dumbbell type 1 according to ISO 527, and with a thickness of 3 mm. The dumbbells were produced at 250° C. with a flow front velocity of 200 mm/s. The elongation at break with weld line was determined on dumbbells produced in this manner by tensile tests according to ISO 527 at 23° C.

Determination of stress-whitening:
  By volume increase at 23° C. during deformation under tensile stresses. The method has been described in detail by F. Ramsteiner (Acta Polymerica 42, 1991, p. 584–589). The values (measured as $d(V/V_0)/d\epsilon$) can be from 0 to 1, low values indicating a small increase in volume and therefore a low tendency to stress-whitening.

Determination of gel content:
  By extraction in boiling p-xylene, for which about 2 g of polymer were weighed into a Soxhlet holder and extracted over 24 hours. The insoluble fraction remaining in the holder after drying is the gel content.

Example 1

100 parts by weight of a propylene polymer a) comprising 85% by weight of propylene homopolymer $a_1$) and 15% by weight of propylene-ethylene copolymer $a_2$) [determined by extraction fractionation according to W. Holtrup, Makromol. Chem. 178, 2335 (1977)], an ethylene content of 52% by weight, based on $a_2$) [determined by infrared spectroscopy] and a melt flow index of 5.9 g/10 min [at 230° C. and 2.16 kg, according to ISO 1133], were mixed in the twin-screw extruder with 0.6 part by weight of trimethylolpropane triacrylate and 0.01 part by weight of 2,5-dimethyl-2,5-di(tert-butylperoxy)hexane, at 240° C., 20 bar and with a mean residence time of 30 seconds. The mixture was then extruded and granulated, giving a colorless and odorless product.

The properties of the plastic composition obtained above can be seen in Table 1 below.

Comparative Example A

The propylene polymer a) employed in Example 1 was tested without further modification. The same parameters were determined as in Example 1. The results are in Table 1 below.

Example 2

Example 1 was repeated under the same conditions but the polymer a) was a propylene polymer comprising 75% by weight of propylene homopolymer $a_1$) and 25% by weight of propylene-ethylene copolymer $a_2$) with an ethylene content of 53% by weight, based on $a_2$) and a melt flow index of 7.7 g/10 min.

The properties of the resultant plastic composition can be seen in Table 1 below.

Comparative Example B

The propylene polymer a) employed in Example 2 was tested without further modification. The same parameters were determined as in Example 2. The results are in Table 1 below.

As shown by comparison of Example 1 and Comparative Example A, and of Example 2 and Comparative Example B, the polymers obtained by the partial crosslinking according to the invention have significantly improved notched impact strength with about the same level of stiffness, ie. a significantly improved stiffness/toughness ratio. In addition, not only is the weld line strength improved (fourfold increase in the elongation at break of dumbbell test specimens molded in two parts), but the heat resistance is increased and the tendency to stress-whitening is drastically reduced.

TABLE 1

|  | Examples | | | |
| --- | --- | --- | --- | --- |
|  | 1 | A | 2 | B |
| Melt flow index [g/10 min] | 6.2 | 5.9 | 9.3 | 7.7 |
| Tensile modulus of elasticity [MPa] | 1262 | 1173 | 1006 | 1024 |
| Charpy notched impact strength, 23° C. [kJ/m²] | 48 T* | 7 | 60 T | 29 |
| Charpy notched impact strength, 0° C. [kJ/m²] | 10 | 4 | 40 | 8 |
| Charpy notched impact strength, −20° C. [kJ/m²] | 5 | 2 | 9 | 6 |
| Elongation at break with weld line [%] | 10 | 2 | 12 | 3 |
| Vicat softening temperature VST/A50 [0° C.] | 152 | 152 | 146 | 143 |
| Vicat softening temperature VST/B50 [0° C.] | 73 | 66 | 59 | 57 |
| Stress-whitening $d(V/V_0)/d\epsilon$ | 0.03 | 0.08 | 0.03 | 0.39 |
| Gel content [%] | 0 | 0 | 0 | 0 |

*T: test specimen partially fractured

Comparative Example C 100 parts by weight of a propylene polymer a) comprising 55% by weight of propylene homopolymer $a_1$) and 45% by weight of propylene-ethylene copolymer $a_2$) [determined by extraction fractionation according to W. Holtrup, Makromol. Chem. 178, 2335 (1977)], an ethylene content of 53.5% by weight, based on the latter component [determined by infrared spectroscopy] and a melt flow index of 2.2 g/10 min [at 230° C. and 2.16 kg, according to ISO 1133], were mixed in the twin-screw extruder with 0.6 part by weight of trimethylolpropane triacrylate and 0.01 part by weight of 2,5-dimethyl-2,5-di(tert-butylperoxy)hexane, at 240° C., 20 bar and with a mean residence time of 30 seconds. The mixture was then extruded and granulated, giving a colorless and odorless product.

The properties of the resultant plastic composition can be seen in Table 2 below.

TABLE 2

|  | Comparative Example C |
| --- | --- |
| Melt flow index [g/10 min] | 2.2 |
| Tensile modulus of elasticity [MPa] | 497 |
| Charpy notched impact strength, 23° C. [kJ/m²] | 96 T |
| Charpy notched impact strength, 0° C. [kJ/m²] | 79 T |
| Charpy notched impact strength, −20° C. [kJ/m²] | 45 T |
| Elongation at break with weld line [%] | >400 |
| Vicat softening temperature VST/A50 [°C.] | 116 |
| Vicat softening temperature VST/B50 [°C.] | 37 |
| Gel content [%] | 0 |

*T: test specimen partially fractured

As the results show, Comparative Example C gives very low stiffness and poor heat resistance.

We claim:

1. A partially crosslinked plastic composition with a melt flow index, at 230° C. and under a load of 2.16 kg, of from 0.1 to 100 g/10 min and a gel content of less than 12% by weight, prepared from
   a) a polymer prepared in a multi-step polymerization process comprising
      $a_1$) from 60 to 92% by weight of a propylene homopolymer and
      $a_2$) from 8 to 40% by weight of a propylene copolymer having $C_2$–$C_{10}$-alk-1-enes incorporated into its polymer chain and with a comonomer content, based on $a_2$) of from 15 to 70% by weight, and
   b) a compound of the formula (I)

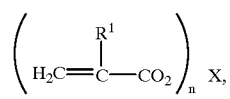

(I)

where
   $R^1$ is hydrogen or $C_1$–$C_4$-alkyl,
   X is substituted or unsubstituted $C_1$–$C_{30}$-alkyl or substituted or unsubstituted $C_7$–$C_{30}$-arylalkyl, where each of the alkyl groups may be interrupted by one or more oxygen atoms in ether moieties (—O—) or oxycarbonyl moieties (—O—) and/or by nitrogen groups of the formula $NR^2$, where $R^2$ is hydrogen, $C_1$–$C_6$-alkyl or $C_1$–$C_6$-hydroxyalkyl, and n is the number 2 or 3, obtainable by reacting the polymer a) with the compound b) at from 180 to 280° C., under a pressure of from 1 to 100 bar, and with mean residence times of the reaction mixture of from 0.2 to 10 minutes.

2. A partially crosslinked plastic composition as claimed in claim 1, wherein the polymer a) is prepared in a multistep polymerization process.

3. A partially crosslinked plastic composition as claimed in claim 1, wherein the polymer a) comprises from 72 to 88% by weight of a propylene homopolymer a) and from 12 to 28% by weight of a propylene copolymer $a_2$).

4. A partially crosslinked plastic composition as claimed in claim 1, wherein the comonomer content of the propylene copolymer $a_2$) is from 30 to 55% by weight.

5. A partially crosslinked plastic composition as claimed in claim 1, obtainable by reacting the polymer a) with the compound b) in the presence of an initiator which decomposes giving free-radicals.

6. A partially crosslinked plastic composition as claimed in claim 1, obtainable by using, for every 100 parts by weight of the polymer a), from 0.001 to 5 parts by weight of the compound b) and from 0 to 2 parts by weight of an initiator which decomposes giving free-radicals.

7. A partially crosslinked plastic composition as claimed in claim 1, obtainable by reacting the polymer a) with compounds b) of the formula (I), where $R^1$ is hydrogen, methyl or ethyl.

8. A partially crosslinked plastic composition as claimed in claim 1, obtainable by reacting the polymer a) with compounds b) of the formula (I), where X is $C_2$–$C_{20}$-alkyl, which may be interrupted by one or more oxygen atoms in an ether moiety.

9. A partially crosslinked plastic composition as claimed in claim 1, wherein compound b) is a trimethylol ($C_2$–$C_4$-alkane) triacrylate.

10. A process for preparing a partially crosslinked plastic composition as claimed in claim 1, which comprises reacting the polymer a) with the compound b) at from 180 to 280° C., at a pressure of from 1 to 100 bar, and with a mean residence time of the reaction mixture of from 0.2 to 10 minutes in a preparation reactor.

11. A process for preparing a partially crosslinked plastic composition as claimed in claim 10, which comprises reacting the polymer a) immediately after its preparation, in a mixing apparatus joined to the preparation reactor, with the compound b) as claimed in claim 1.

12. A film, a fiber or a shaped article made from a partially crosslinked plastic composition as claimed in claim 1.

* * * * *

UNITED STATES PATENT AND TRADEMARK OFFICE
CERTIFICATE OF CORRECTION

PATENT NO.: 5,994,471

DATED: November 30, 1999

INVENTOR(S): SEELERT te al.

It is certified that error appears in the above-identified patent and that said Letters Patent is hereby corrected as shown below:

On the cover page, insert the following priority information:

--[30] Foreign Application Priority Data
Nov. 8, 1996 [DE] Germany ............ 196 46 118.9--.

In the abstract, line 9 after formula I, "C-$C_6$-alkyl" should be --$C_1$-$C_6$-alkyl--.

Signed and Sealed this

Eighteenth Day of July, 2000

*Attest:*

Q. TODD DICKINSON

*Attesting Officer*     *Director of Patents and Trademarks*